Sept. 30, 1930.  M. RÜTTGER-PELLI  1,777,151
APPARATUS FOR MASSAGING
Filed Sept. 28, 1929
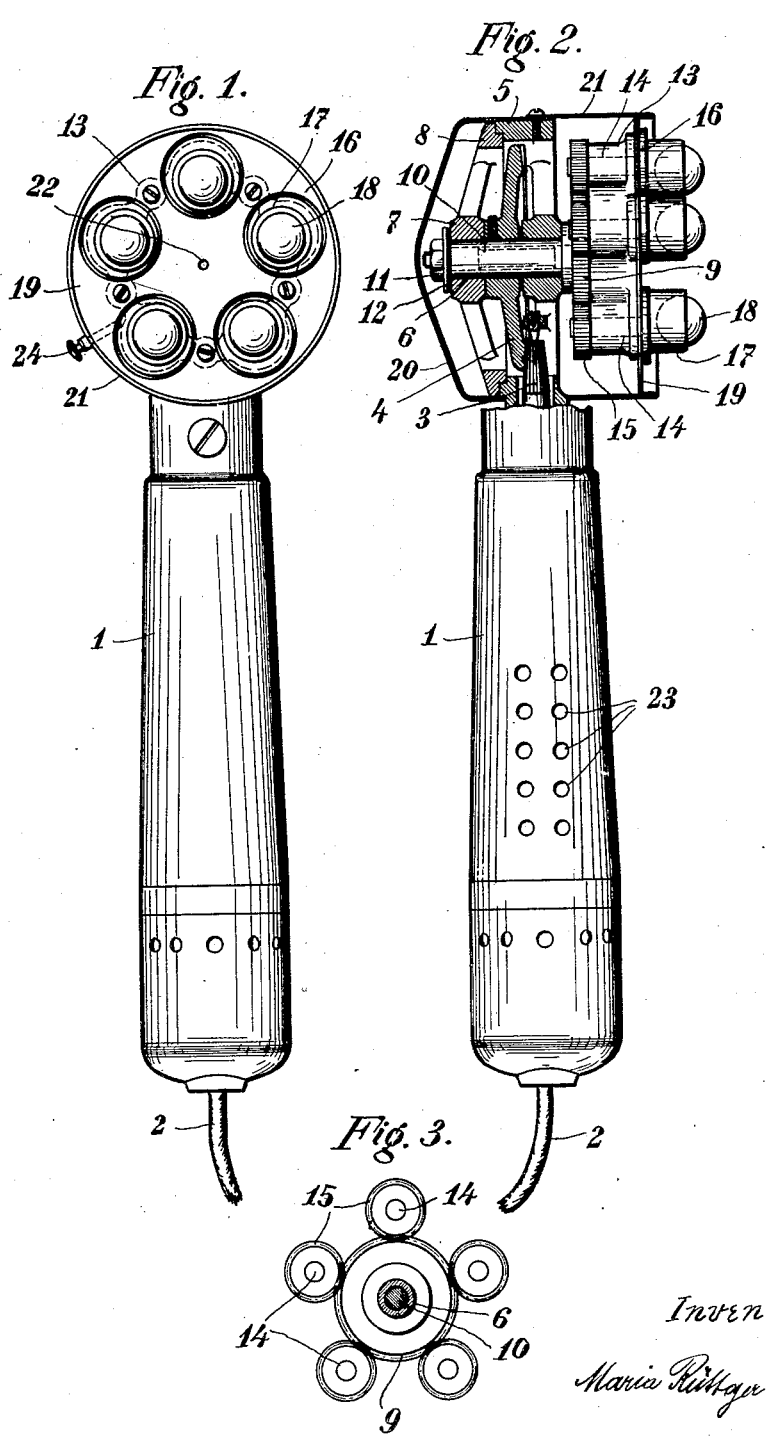

Patented Sept. 30, 1930

1,777,151

UNITED STATES PATENT OFFICE

MARIA RÜTTGER-PELLI, OF LUCERNE, SWITZERLAND

APPARATUS FOR MASSAGING

Application filed September 28, 1929, Serial No. 395,766, and in Germany September 2, 1929.

The present invention relates to improvements in apparatus for massaging the human body by means of balls to which a positive progressive and rotative movement is transmitted by a driving shaft.

The object of the present invention is to have the transmission effected by means of a planetary gear driven from a motor provided within the handle of the apparatus the mounting of the freely movable balls being arranged eccentrically to the axes of the planetary wheels moving the said mountings so that while rotating each ball will travel a small circular path.

The object of the apparatus according to the present invention is to replace completely all manual massaging and to execute the so-called pinching, kneading and stroking massaging. While the progressive movement of the balls may replace the massaging by strokes the circular individual movement of the balls may countervail the pinching or kneading massaging. In the accompanying drawing representing one working example of the object of the invention—

Figure 1 is a front view of the apparatus,
Figure 2 a cross section through the driving mechanism of the balls, and
Figure 3 a diagrammatical view of the planetary gear.

According to the drawing the apparatus possesses a handle 1 enclosing an electromotor fed with current by a cable 2. The shaft of the electromotor is the driving shaft and carries a small bevel pinion 3 gearing with a larger wheel 4 secured fast to a hollow shaft 6 journalled in the hub 7 of a hoop 8 fitted into the framing, so that the wheel 4 is located between the bearings. On the outside of the framing 5 also the sun wheel 9 of a planetary gear is fixed to the hollow shaft 6, while an axle 10 is rotatably held in place inside of this hollow shaft on one end by means of a nut 11 with a washer 12 and on the other end by means of a plate 13 secured rigidly fast to said axle. In this plate are journalled the axles 14 of five planet wheels 15 meshing with the wheel 9. While the planetary gear is disposed on one side of plate 13 disks 16 are carried by the axles 14 on the other side of the plate and mountings 17 for balls 18 are arranged eccentrically on said disks. These balls are held freely movable in their mountings and project to the outside through a shield plate 19 screwed fast to the plate 13. A sheet metal shell 21 is secured by screws to a sheet iron hood 20 and the two enclose the whole mechanism. A hole 22 in the shield plate facilitates the lubricating of the journals of the shaft 6 and axles 10 and 14 while air holes 23 insure the ventilating of the electromotor.

When the described apparatus is worked the sun wheel 9 turns and with it the plate 13 with the planet wheels 15 and the balls 18 will execute a progressive movement on a circular path that is the so-called stroking massaging. But a stopping pin 24 is slidably arranged within the sheet-metal shell 21 in such a way that it projects into one of the spaces of the plate 13 between the journals of two planet wheels and hinders the turning of said plate. If this happens, the sun wheel 9, because the plate 13 with the planet wheels cannot turn, will continue turning and the single planet wheels will turn in their journals. Instead of a progressive movement each ball in its position will turn in a small circle the size of which is determined by the eccentrical arrangement of the ball with regard to the wheel axle and therefore when the apparatus is brought into contact with a part of the body each ball will execute a small rotative movement at the same place or that what is called the pinching or kneading massaging. By pushing in and out this stop pin 24 any desired massaging may be executed with the same apparatus.

What I claim as new is:

1. In an apparatus for massaging the human body by means of balls and in combination, a circular framing provided with a hub and attached to this handle, a bevel driving pinion extended from the inside of said handle into said circular framing, a hoop provided with a hub and fitted to said circular framing, and a hollow shaft journalled in the hubs of framing and hoop, a bevel wheel, and the sun wheel of a planetary gear secured both fast to said shaft, the first between hoop and framing and the latter outside of this framing, an axle having a plate secured at one end of the same and fitted rotatably into said shaft, and axles fitted rotatably into said plate, planet wheels carried at one end of said axles and meshing with said sun wheel, and ball-mountings carried at the other ends of said axles and having balls held freely movable therein and arranged eccentrically with regard to said axles.

2. In an apparatus for massaging the human body by means of balls and in combination, a hollow handle enclosing an electromotor as driving means, a circular framing provided with a hub and attached to this handle, a bevel driving pinion extended from the inside of said handle into said circular framing, a hoop provided with a hub and fitted to said circular framing, and a hollow shaft journalled in the hubs of framing and hoop, a bevel wheel, and the sun wheel of a planetary gear secured both fast to said shaft, the first between hoop and framing and the latter outside of this framing, an axle having a plate secured at one end of the same and fitted rotatably into said shaft and axles fitted rotatably into said plate, planet wheels carried at one end of said axles and meshing with said sun wheel, and ball-mountings carried at their other ends having balls held freely movable therein and arranged eccentrically with regard to the said axles, a hood and a shell secured to the framing and enclosing the whole mechanism and a shield plate through which the ball mountings extend to the outside, said plate being screwed to said first named plate, a slidably arranged stop pin in said shell adapted to project into the space between the bearings of two planet wheel axles so as to block the planet wheels with a view of producing an individual movement of the single balls on a circular path.

In testimony whereof I affix my signature.

MARIA RÜTTGER-PELLI.